(12) United States Patent
Mansour et al.

(10) Patent No.: US 8,594,250 B2
(45) Date of Patent: Nov. 26, 2013

(54) APPARATUS AND METHODS FOR COMPUTING CONSTANT AMPLITUDE ZERO AUTO-CORRELATION SEQUENCES

(75) Inventors: Mohamad M. Mansour, San Jose, CA (US); Vincent Loncke, Piscataway, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 886 days.

(21) Appl. No.: 12/505,490

(22) Filed: Jul. 19, 2009

(65) Prior Publication Data

US 2010/0020905 A1 Jan. 28, 2010

Related U.S. Application Data

(60) Provisional application No. 61/083,818, filed on Jul. 25, 2008.

(51) Int. Cl.
*H04L 27/06* (2006.01)

(52) U.S. Cl.
USPC ........... 375/343; 375/260; 375/316; 375/340; 375/342; 370/210; 370/344; 370/464; 370/480

(58) Field of Classification Search
USPC .......... 375/260, 316, 340, 342, 343; 370/210, 370/344, 464, 480
See application file for complete search history.

(56) References Cited

U.S. PATENT DOCUMENTS

| | | | |
|---|---|---|---|
| 7,254,186 B2* | 8/2007 | Liu ............................... | 375/316 |
| 8,200,728 B2* | 6/2012 | Michaels et al. .............. | 708/276 |
| 2003/0021365 A1* | 1/2003 | Min et al. ...................... | 375/343 |
| 2003/0031275 A1* | 2/2003 | Min et al. ...................... | 375/326 |
| 2008/0075184 A1 | 3/2008 | Muharemovic et al. | |

FOREIGN PATENT DOCUMENTS

| | | |
|---|---|---|
| EP | 1909446 | 4/2008 |
| JP | 2005101695 A | 4/2005 |
| JP | 2007142892 A | 6/2007 |
| JP | 2008148013 A | 6/2008 |
| WO | WO 2006083940 | 8/2006 |
| WO | 2007126793 A2 | 11/2007 |

OTHER PUBLICATIONS

International Search Report—PCT/US2009/051582—International Search Authority, European Patent Office, Nov. 19, 2009.
Written Opinion—PCT/US2009/051582—ISA/EPO—Nov. 19, 2009.

* cited by examiner

*Primary Examiner* — Leon Flores
(74) *Attorney, Agent, or Firm* — Stanton Braden

(57) ABSTRACT

Apparatus and methods for calculating constant amplitude zero auto-correlation sequences are disclosed. One method includes calculating an argument of trigonometric functions used for calculating a constant amplitude zero auto-correlation sequence based at least on additive recursion of an input sequence root constant and without multiplication by a variable. A constant amplitude zero auto-correlation sequence is then computed using a CORDIC algorithm configured to calculate trigonometric functions used in determining the sequence without performing multiplication operations and based on the calculated argument. The disclosed methods and apparatus may be applied, in particular, to efficiently computing Zadoff-Chu sequences in preamble detection in particular physical random access channels in Long Term Evolution LTE communication systems. By allowing computation of such sequences, memory requirements can be reduced.

48 Claims, 6 Drawing Sheets

APPARATUS AND METHODS FOR COMPUTING CONSTANT AMPLITUDE ZERO AUTO-CORRELATION SEQUENCES

CLAIM OF PRIORITY UNDER 35 U.S.C. §119

The present Application for Patent claims priority to Provisional Application No. 61/083,818 entitled "Efficient Architecture for Computing Zadoff-Chu Sequences in Frequency Domain Using the CORDIC Algorithm" filed Jul. 25, 2008, and assigned to the assignee hereof and hereby expressly incorporated by reference herein.

BACKGROUND

1. Field

The present disclosure relates generally to apparatus and methods for computing constant amplitude zero auto-correlation sequences, and more specifically to real-time computing of Zadoff-Chu sequences for preambles in a communication system.

2. Background

In cellular communications, the physical random access channel (PRACH) is a common uplink channel used by mobile users within a cell to establish initial access to a base station, along with uplink synchronization to compensate for round-trip delays to the base station. The mechanism is based on the mobile user equipment (UE) transmitting a randomly-chosen preamble to a base station (e.g., eNodeB) over a dedicated time-frequency resource on the PRACH, such as in the emerging Third Generation Partnership Project (3GPP) long-term evolution (LTE) physical layer standard. A pool of known preambles is allocated to a base station within a cell. A PRACH processor, or searcher, in the base station attempts to detect a transmitted preamble by first extracting the PRACH signal from a received wideband OFDM signal, then performing matched filtering across the pool of preambles allocated to the base station. The matched filtering is performed as a cross-correlation of the extracted PRACH signal with each of the known preambles dedicated to the base station. The cross correlations provide a final metric that is compared to a threshold, from which the presence of a preamble can be detected and the mobile user's timing offset relative to the base station can be estimated.

An important requirement is that the system must be capable of supporting a large number of users per cell with quasi-instantaneous access to the radio resources, and sustain a good detection probability, while maintaining a low false alarm rate. Hence, preambles must be constructed using sequences that possess good periodic correlation properties. One candidate sequence is the well-known Zadoff-Chu (ZC) sequence, which belongs to a class of sequences called constant amplitude zero auto-correlation (CAZAC) sequences. These sequences are currently employed in the emerging LTE PHY layer standard to construct PRACH preambles. ZC sequences are complex exponential codes whose discrete auto-correlations are zero for all non-zero lags, with no restrictions on code lengths. A disadvantage, however, is that ZC sequences are difficult to generate in real-time due to the nature of their construction. Known implementations typically resort to pre-computing these sequences off-line, quantizing them to the required precision, and storing them in memory. For example, in LTE with 3-sector cells where a pool of 64 preambles of length 839 are allocated to each sector (Format-0 preambles), a memory storage of 2.5 M-bits is needed to store these complex-valued sequences, assuming 8-bit quantization. In the case of LTE, the standard must also support preambles of length 139, so the total memory needed is around 3 M-bits. Accordingly, in one aspect it would be desirable to reduce need for storing ZC sequences, such as through efficient generation of ZC sequences in real-time.

SUMMARY

According to an aspect, a method for calculating constant amplitude zero auto-correlation sequences is disclosed. The method includes calculating an argument of trigonometric functions used for calculating at least one constant amplitude zero auto-correlation sequence based at least on additive recursion of an input sequence root constant and without multiplication by a variable. Additionally, the method includes calculating the at least one constant amplitude zero auto-correlation sequence using a CORDIC algorithm configured to calculate trigonometric functions used in determining the sequence without performing multiplication operations and based on the calculated argument.

According to another aspect an apparatus for calculating constant amplitude zero auto-correlation sequences is disclosed. The apparatus includes an argument computation unit configured to calculate an argument of trigonometric functions used for calculating at least one constant amplitude zero auto-correlation sequence based at least on additive recursion of an input sequence root constant and without multiplication by a variable. The apparatus also includes a CORDIC calculation unit configured to calculate the at least one constant amplitude zero auto-correlation sequence using a CORDIC algorithm configured to calculate trigonometric functions used in determining the sequence without performing multiplication operations and based on the calculated argument.

In yet another aspect, a method for detecting a preamble sequence based on a constant amplitude zero auto-correlation sequence in a communication signal is disclosed. The method includes calculating a plurality of constant amplitude zero auto-correlation sequences based on a CORDIC algorithm configured to determine trigonometric functions without multiplication operations, and correlating the preamble sequence in the communication signal with the plurality of constant amplitude zero auto-correlation sequences to determine a sequence of the plurality having a maximum correlation to the preamble sequence. Finally, the method includes determining the preamble sequence if the sequence of the plurality having the maximum correlation to the preamble sequence exceeds a predetermined threshold.

In still another aspect, an apparatus for detecting a preamble sequence based on a constant amplitude zero auto-correlation sequence in a communication signal is described. The apparatus includes a sequence generator configured to calculate a plurality of constant amplitude zero auto-correlation sequences based on a CORDIC algorithm configured to determine trigonometric functions without multiplication operations, and a correlation unit configured to correlate the preamble sequence in the communication signal with the plurality of constant amplitude zero auto-correlation sequences to determine a sequence of the plurality having a maximum correlation to the preamble sequence. The apparatus further includes a signal detection unit configured to determine the preamble sequence if the sequence of the plurality having the maximum correlation to the preamble sequence exceeds a predetermined threshold.

In yet a further aspect, an apparatus for detecting a preamble sequence based on a constant amplitude zero auto-correlation sequence in a communication signal is disclosed. The apparatus includes means for calculating a plurality of constant amplitude zero auto-correlation sequences based on a CORDIC algorithm configured to determine trigonometric functions without multiplication operations, and means for correlating the preamble sequence in the communication signal with the plurality of constant amplitude zero auto-correlation sequences to determine a sequence of the plurality having a maximum correlation to the preamble sequence. The apparatus also includes means for determining the preamble sequence if the sequence of the plurality having the maximum correlation to the preamble sequence exceeds a predetermined threshold.

In one further aspect, a computer program product comprising: computer-readable medium is disclosed. The medium comprises code for causing a computer to calculate a plurality of constant amplitude zero auto-correlation sequences based on a CORDIC algorithm configured to determine trigonometric functions without multiplication operations, and code for causing a computer to correlate a preamble sequence in a communication signal with the plurality of constant amplitude zero auto-correlation sequences to determine a sequence of the plurality having a maximum correlation to the preamble sequence. The medium further comprises code for causing a computer to determine the preamble sequence if the sequence of the plurality having the maximum correlation to the preamble sequence exceeds a predetermined threshold.

DETAILED DESCRIPTION

Disclosed herein are apparatus and methods for efficient computation of Zadoff-Chu (ZC) sequences with high accuracy in real-time. When applied to a communication system, such as an LTE system, this reduces the need for storing ZC sequences for PRACH preambles, for example. In an aspect, algorithm transforms are used that eliminate multipliers with non-constant terms. Furthermore, by exploiting a duality relationship between ZC sequences in time domain and frequency domain, ZC sequences can be easily calculated in both domains. An important consequence of this duality is that the correlation operation for detection of a sequence can be computed more efficiently by passing to the frequency domain. Correlation in frequency domain corresponds to multiplying the FFT of the received noisy preamble with a preamble generated using ZC sequences in frequency domain, and then taking the inverse FFT. In a further aspect, the ZC computation is based on the use of a Coordinate Rotation Digital Computer (CORDIC) algorithm for computing complex exponentials using only shift and add operations.

Figure 1:
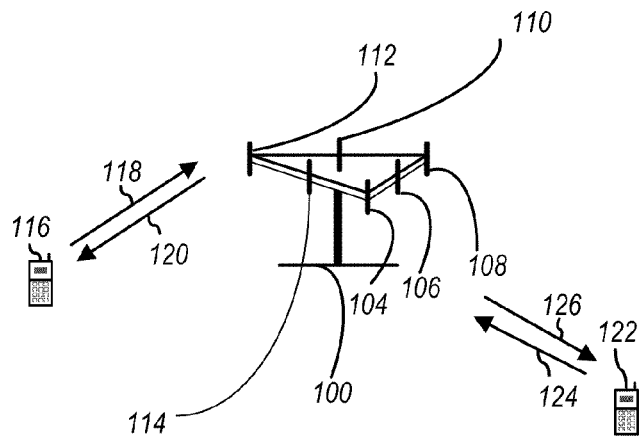
FIG. 1 illustrates an example of a wireless communication system in which the presently disclosed apparatus and methods may be utilized.

Referring to FIG. 1, an example of a multiple access wireless communication system in which the present methods and apparatus may be employed is shown. An base station 100 (e.g., eNodeB) includes multiple antenna groups, one including 104 and 106, another including 108 and 110, and an additional including 112 and 114. In FIG. 1, only two antennas are shown for each antenna group, however, more or fewer antennas may be utilized for each antenna group. Mobile devices, such as User Equipment 116 (UE) may be in communication with antennas 112 and 114, where antennas 112 and 114 transmit information to UE 116 over a downlink or forward link 120 and receive information from access UE 116 over an uplink or reverse link 118. Another UE 122 is shown in communication with antennas 106 and 108, where antennas 106 and 108 transmit information to UE 122 over downlink 126 and receive information from UE 122 over uplink 124. It is noted that one or more base stations 100 may be utilized to engender a communication network to which the UE 116, 122 connection. It is noted that although described herein using the terminology of LTE, eNodeB 100 may be a fixed station used for communicating with the terminals and may also be referred to as a base station, an access point, or some other terminology. User Equipment 116, 122 may also be called an access terminal, a wireless communication device, terminal, or some other terminology.

Prior to transmission of data, a mobile terminal or UE (e.g., 116, 122) needs to establish connectivity to the network through a process called "cell-search" assuming an LTE network. As a result, the UE obtains the identity of the cell and estimates the frame timing of the identified cell. The UE can then request a connection setup by undertaking a random access process to establish uplink synchronization and obtain a unique identity. The random access procedure consists of transmission of a random-access preamble by the UE (116, 122), allowing the base station 100 (eNodeB) to estimate the transmission timing of the UE (116, 122). In response, eNodeB 100 transmits a timing advance command to adjust the UE transmit timing based on the estimate of the transmission timing of the UE. This mechanism is handled by the physical layer (PHY) in LTE through the physical random-access channel (PRACH).

The PRACH provides a mechanism for UE to establish initial access along with uplink synchronization by transmitting a preamble over a dedicated time-frequency resource. The preamble transmitted by the UE is randomly chosen from a pool of preambles allocated to an eNodeB (e.g., 100). The PRACH processor (e.g., a "Searcher") in the eNodeB attempts to detect a transmitted preamble by first extracting the PRACH signal from a received wideband OFDM signal, then performing matched filtering across the pool of preambles allocated to an eNodeB. The matched filtering is performed as a circular cross-correlation of the extracted PRACH signal with each of the known preambles dedicated to the eNodeB. This circular cross-correlation is implemented in the frequency domain as a complex multiplication of a post-FFT PRACH signal with a frequency domain representation of the preamble. An IFFT is performed on the result to provide a vector of cross correlations. The cross-correlation vector is then non-coherently combined across antennas to provide the final metric to be compared to a threshold. The preamble is based on Zadoff-Chu (ZC) sequences represented in frequency domain.

Figure 2:
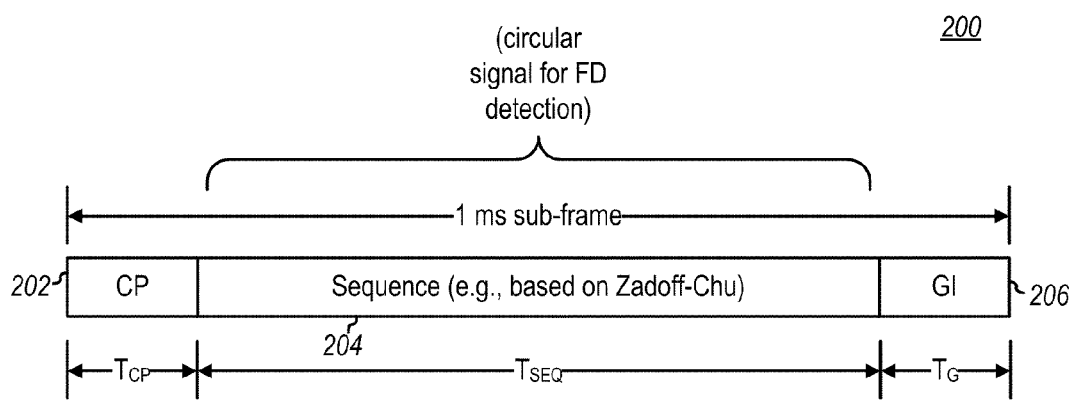
FIG. 2 illustrates an exemplary PRACH symbol structure.

As background, the PRACH preamble consists of three parts, as illustrated by the exemplary preamble sub-frame 200 shown in FIG. 2. These parts are a cyclic prefix 202, a sequence (e.g., a sequence based on ZC with zero correlation) 204, and a guard interval 204, having durations $T_{CP}$, $T_{SEQ}$, and $T_G$ respectively. It is noted that there are various preamble formats in LTE consisting of different $T_{CP}$, $T_{SEQ}$, and $T_G$ lengths to support different cell size requirements. The example of FIG. 2 illustrates preamble Format-0 for small-medium cells, as merely one example.

The sequence part of the preamble 204 is constructed using constant amplitude zero auto-correlation sequences; namely ZC sequences with zero correlation zone, being generated from one or several root ZC sequences. The network configures the set of preamble sequences that the UE is allowed to use, and the preamble transmitted by the UE is randomly chosen from this pool. In the example of an LTE system, there are 64 preamble sequences available in each cell. This set of preamble sequences is found from ZC sequences with pre-configured roots and all their cyclic shifts.

A ZC sequence with root γ and length N in time domain may be defined as:

$$z_\gamma[n] = \begin{cases} \exp\left(-j\frac{2\pi\gamma}{N}\left(\frac{n(n+2q)}{2}\right)\right), & N \text{ even} \\ \exp\left(-j\frac{2\pi\gamma}{N}\left(\frac{n(n+1+2q)}{2}\right)\right), & N \text{ odd} \end{cases} \quad (1)$$

for n=0, 1, ..., N-1, where q is an arbitrary integer and γ is a positive integer (called the index or root) relatively prime to N (i.e., gcd (γ, N)=1). The number of ZC sequences of a given (or the number of possible values of the index γ) equals the number of integers that are relatively prime to the length N, which is given by Euler's totient function φ(N). For purposes of this application, the assumed class of ZC sequences assumes N to be an odd prime (hence there are φ(N)=N-1 distinct such ZC sequences).

It is noted in brief, however, that there may be some applications where the required length of a ZC sequence is a composite integer M, and hence prime-length ZC sequences cannot be directly used. Instead, such composite-length ZC sequences are derived from prime-length ZC sequences. Two methods are typically employed: 1) truncation, or 2) cyclic extension. In truncation, as the name implies, a ZC sequence of length N, where N is the smallest prime number larger than or equal to the required length M, is truncated to length M. In the cyclic extension method, a ZC sequence of length N is cyclically extended to length M, where N is largest prime smaller than or equal to M.

CAZAC sequences, and in particular, ZC sequences possess good correlation properties which are essential in a variety of engineering applications such as establishing timing synchronization between a mobile terminal and a base station, performing channel estimation, and reducing peak-to-average power ratio. The periodic auto-correlation function $R_{zz}[\tau]$ of a sequence z of length N is defined as:

$$R_{zz}[\tau] = \sum_{n=0}^{N-1} z[n] \cdot z^*[(n+\tau) \bmod N] \quad (2)$$

where τ is an integer and * denotes complex conjugation. It is easy to show that for a ZC sequence $z_\gamma$, the periodic auto-correlation function $Rz_\gamma z_\gamma[0]=N$, and $Rz_\gamma z_\gamma[\tau]=0$ if τ≠0 mod N. Therefore, the out-of-phase value of $Rz_\gamma z_\gamma[\tau]$ is zero for a ZC sequence, and thus a ZC sequence is referred to as a perfect sequence.

In addition, the periodic cross-correlation function of two sequences x and y of length N is defined as $$R_{xy}[\tau] = \sum_{n=0}^{N-1} x[n] \cdot y^*[(n+\tau) \bmod N]. \quad (3)$$

Let $\Gamma=\{z_\gamma[n] | 1 \le N-1\}$ denote the set of (N-1) ZC sequences of length N. It is known that $|Rz_{\gamma i}z_{\gamma j}[\tau]|$ will be equal to $\sqrt{N}$ for any integer r and any distinct pair of sequences $z_{\gamma i}$, $z_{\gamma j} \in \Gamma$.

The correlation properties of a ZC sequence remain invariant under cyclic shifts, addition of a constant to the phases in the exponentials in equation (1), or conjugation of the entire sequence. Moreover, addition of a linear phase shift of the form $$\exp\left(j\frac{2\pi qn}{N}\right)$$

where q is an integer, also will not affect the correlation properties. Hence, q in equation (1) is typically set to 0 without any loss of generality.

Finally, is noted that ZC sequences obviously have constant amplitude, which is in line with the basic characteristics of 3G transmission schemes. Hence ZC sequences are typically termed constant-amplitude zero-auto-correlation (CAZAC) sequences. For composite-length ZC sequences derived from prime-length ZC sequences, the CAZAC property however is degraded to some extent.

As noted before, it is has been shown that there exists a duality between ZC sequences in the time domain and in the frequency domain. The discrete Fourier transform (DFT) of a ZC sequence $z_\gamma[n]$ in time domain with root γ and length N is another ZC sequence $Z_\gamma[k]$ in the frequency domain. The relationship between the two sequences (i.e., the time domain and frequency domain sequences) is given by the following equation:

$$Z_\gamma[k] = \sum_{n=0}^{N-1} z_\gamma[n] \exp\left(-j\frac{2\pi nk}{N}\right), \quad (4)$$
$$k = 0, 1, \ldots, N-1.$$

One way of obtaining the ZC sequences resultant from equation (4) would be to pre-compute the sequences with this equation and then store the elements of the sequence in memory. This possibility is not practically tenable, however, as the memory requirements in this case would be too high. For example, assuming 3-sector base stations, where each sector must store 64 sequences each of length 839, and each complex elements of the sequence is represented using 16 bits (8 for real, and 8 for imaginary), the total memory needed is ~2.5 Mbits, which would be quite costly in terms of memory for a mobile terminal.

Accordingly, another alternative discussed herein includes providing methods and hardware architecture that efficiently compute the elements of the sequence in equation (2), hence eliminating the need for large storage overhead. It is noted that $z_\gamma[n]$ and $Z_\gamma[k]$ are both periodic sequences of period N.

Accordingly, the relationship between the time domain $z_\gamma[n]$ and frequency domain $Z_\gamma[k]$ ZC sequences may be expressed as follows:

$$Z_\gamma[k] = Z_\gamma[0] \cdot z_\gamma^*[\gamma' k] \quad k=0,1,\ldots,N-1 \tag{5}$$

where $\gamma'$ is the multiplicative inverse of modulo N (i.e., $\gamma' \cdot \gamma = 1 \bmod N$). Thus, it will be evident to one skilled in the art that a ZC sequence can be directly generated in the frequency domain without the need for a DFT operation (e.g., eliminates the need to compute the DFT of equation (4)).

Recognizing the duality above between ZC time and frequency domains, in an aspect the presently disclosed methods and apparatus effect an optimized methodology for computing CAZAC sequences (e.g., ZC sequences) both in time domain (TD) and frequency domain (FD) using a COordinate Rotation DIgital Computer (CORDIC) algorithm. From the theorem expressed by equation (5) it is evident that both the time domain ZC sequence $z[n]$ and frequency domain ZC sequence $Z[n]$ are related and that the frequency domain ZC sequence can be easily determined based on complex multiplication with a scaling constant $Z_\gamma[0]$. Specifically, in the frequency domain the same ZC sequence $z[n]$ may be computed, except that its elements are conjugated (as indicated in the above equation (5) by the asterisk), scaled by complex multiplication with the constant $Z_\gamma[0]$, and reordered according to the map $n \to \gamma' n (\bmod N)$, where $\gamma' \cdot \gamma = 1 \bmod N$. Accordingly, the frequency domain ZC sequence is obtainable without multiplication by a variable, but merely a scaling constant thereby reducing the overall complexity of the frequency domain determination.

From equation (1) above, it is noted that the based on Euler's formula (i.e., $e^{jx} = \cos x + j \sin x$), a ZC sequence can be evaluated using trigonometric functions as:

$$z_\gamma[n] = \cos\left(\frac{2\pi\gamma}{N}\left(\frac{n(n+1)}{2}\right)\right) - j\sin\left(\frac{2\pi\gamma}{N}\left(\frac{n(n+1)}{2}\right)\right). \tag{6}$$

The CORDIC algorithm is a known hardware-efficient iterative algorithm for evaluating trigonometric and other transcendental functions using only shift and add operations; i.e., determining trigonometric functions without multiplication operations. The algorithm, is derived from the general Givens rotation transform, and can perform the rotation of a two-dimensional vector $(x,y)$ in linear, circular and hyperbolic coordinates. In the present application, it is assumed that the CORDIC algorithm is in rotation mode and the rotation angle is restricted to be within the range $|\theta| \leq \pi/2$. It is noted that other rotation angles outside this range can be easily converted to be within this range. Accordingly, a circular CORDIC rotation with accuracy of B fractional bits is expressed by the group of equations as follows:

$$x_{i+1} = x_i - y_i \cdot d_i \cdot 2^{-i},$$

$$y_{i+1} = y_i + x_i \cdot d_i \cdot 2^{-i}, \tag{7}$$

$$z_{i+1} = z_i - d_i \cdot \tan^{-1}(2^{-i})$$

For $i=1, 2, \ldots, B$, where $x_i, y_i$ are the vector coordinates at an ith iteration, and $z_i$ is the residual angle relative to the x-axis at the ith iteration. Addition or subtraction of the ith micro-rotation angle $\tan^{-1}(2^{-i})$ is selected based on a decision variable $d_i$, where $d_i = -1$ if $z_i < 0$, and $+1$ otherwise. If the initial inputs are set as $x_1 = K$, $y_1 = 0$, $z_1 = \theta$, where $|\theta| \leq \pi/2$ and $$K = \prod_{i=1}^{B} \sqrt{(1+2^{-2i})},$$

then the final outputs after B iterations will converge to the cosine and sine functions $x_{B+1} = \cos(\theta)$ and $y_{B+1} = \sin(\theta)$. The scaling constant K is fixed and can be pre-computed off-line for a given precision B. The arc-tangent values for $2^{-i}$, for $i=1, 2, \ldots, B$, may be stored in a look-up table or equivalent storage.

Thus, the CORDIC algorithm may be utilized to evaluate the exponential portion of equation (1) above by using the sine and cosine functions in equation (6). The argument of the sine and cosine functions however needs to be computed first; namely for $z[n]$ in time domain the argument is $$\left(\frac{2\pi\gamma}{N}\left(\frac{n(n+1)}{2}\right)\right),$$

and for $z_\gamma^*[\gamma' n]$ in frequency domain the argument is $$\left(\frac{2\pi\gamma\gamma'}{N}\left(\frac{n\gamma'(n+1)}{2}\right)\right).$$

To avoid the use of multipliers with non-constant terms in evaluating the arguments for a given n, the arguments are computed recursively as the elements of the ZC sequence are traversed. That is, the argument of $z[n]$ for n is computed using $\arg(z_\gamma[n-1])$ at $n-1$, and the argument of $z_\gamma^*[\gamma' n]$ for n is computed using $\arg(z_\gamma^*[\gamma'(n-1)])$ at $n-1$. To handle both cases, the following equation is defined to be the argument of a ZC sequence element.

$$\theta_m[n] = \frac{2\pi}{N} \frac{\gamma mn(mn+1)}{2}, \tag{8}$$

$$|\theta_m[n]| < \pi/2, n = 0, 1, \ldots, N-1; m = 1 \text{ or } \gamma'$$

In light of equation (8), the argument is $\arg z_\gamma = \theta_1[n]$ with $m=1$ for the time domain sequence, and $\arg(z_\gamma^*[\gamma'(n)]) = \theta_{\gamma'}[n]$ with $m=\gamma'$ for the frequency domain sequence.

In an aspect, one way of evaluating argument $\theta_m[n]$ in equation (8) is to evaluate the equation recursively for $n=0, 1, \ldots, N-1$. Thus, a portion of equation (8) can be defined and evaluated as:

$$\alpha_m[n] = \gamma \frac{mn(mn+1)}{2} (\bmod N) \tag{9}$$

for $m=1$ or $\gamma'$, and $n=0, 1, \ldots, N-1$. The value $\alpha_m[n]$ can be expressed in terms of $\alpha_m[n-1]$ according to the following relationships:

$$\alpha_m[n] = \begin{cases} 0, & n = 0; \\ \alpha_m[n-1] + \gamma m^2 n - \gamma \frac{m(m-1)}{2} (\bmod N), & n \geq 1. \end{cases} \tag{10}$$

It is noted that the terms $\gamma m^2$ and $$\gamma \frac{m(m-1)}{2}$$

are constants for a given ZC root $\gamma$ (which is also referred herein as a "sequence root constant"), and thus can be computed "offline." Moreover, the need for a multiplier to compute the product $\gamma m^2 n$ can be eliminated as well. For example, we can define a relationship as follows:

$$\beta_m[n] = \gamma m^2 n - \gamma \frac{m(m-1)}{2} (\bmod N) \qquad (11)$$

which, in turn, can be expressed in a recursive fashion as:

$$\beta_m[n] = \begin{cases} -\gamma \frac{m(m-1)}{2}, & n = 0; \\ \beta_m[n-1] + \gamma m^2 (\bmod N), & n \geq 1. \end{cases} \qquad (12)$$

The value $\alpha_m[n]$ defined in equation (9), in light of equation (12) may then be defined in terms of $\alpha_m[n]$ as:

$$\alpha_m[n] = \begin{cases} 0, & n = 0; \\ \alpha_m[n-1] + \beta_m[n] \bmod N, & n \geq 1. \end{cases} \qquad (13)$$

Thus, based on equation (13) the argument determined by the relationship in equation (8) may be expressed as:

$$\theta_m[n] = \frac{2\pi}{N} \alpha_m[n]. \qquad (14)$$

Value $\theta_m[n]$ of equation (14) may then be used in the CORDIC equations (7) to efficiently compute $e^{j\theta_m[n]}$. In an aspect, before the value $\theta_m[n]$ is fed to the CORDIC equations (7), this value may be translated into the range of $[-\pi/2, \pi/2]$, or equivalently, $\alpha_m[n]$ translated into the range $[-N/4, N/4]$. In the latter case, the sign and cosine functions would require adjustment, accordingly. The result of the CORDIC equations needs only then to be multiplied by the scaling constant $Z_\gamma[0]$ to derive the desired frequency domain ZC sequence $Z_\gamma[n]$.

As an example of how the above equations may be implemented by a processor or equivalent device, an exemplary pseudo-code is illustrated in Table 1 below.

TABLE 1

Optimized Zadoff-Chu sequence computation algorithm using CORDIC

```
procedure f_γ = Zadoff-Chu (N; γ; m; Z_γ[0]; B; K)
    α_m[0] ← 0, β_m ← -γ m(m-1)/2
    for n = 1 to N-1 do
        β_m[n]←β_m[n - 1] + γm² (mod N)           Note that γm² is a constant.
        β_m[n]←β_m[n - 1] + γm² (mod N)
        if |α_m[n]| > N/2 then                     Translate α_m[n] to [-N/2, N/2]
            α_m[n]←α_m[n] - sgn(α_m[n]) · N
        end if
        s←1                                         Variable for sign adjustment
        r←2α_m[n]
        if |α_m[n]| > N/4 then                     Translate 2α_m[n]/N to [-π/2, π/2]
            r←r - sgn(α_m[n]) · N
            s←-1                                    Results from CORDIC must be negated
        end if
        θ_m[n]←π/N · r                             θ_m[n]∈[-π/2, π/2]
        x[1]←K; y[1]←0; z[1]←θ_m[n]
        for i = 1 to B do                           CORDIC iterations
            x[i + 1]←x[i] - sgn(z[i]) · (y[i] >> i)   Computes cos(θ_m[n])
            y[i + 1]←y[i] + sgn(z[i]) · (x[i] >> i)   Computes sin(θ_m[n])
            z[i + 1]←z[i] - sgn(z[i]) · arctan(2⁻ⁱ)   Computes residual angle
        end for
        if m = 1 then                               Time domain: cos(θ_m[n]) +
            f_γ[n]←s · (x[B + 1] + jy[B + 1])         jsin(θ_m[n])
        else                                        Freq. domain: (cos(θ_m[n]) -
            f_γ[n]←s · (x[B + 1] + jy[B + 1] × Z_γ[0])  jsin(θ_m[n])) × Z_γ[0]
        end if
    end for
end procedure
```

In the above code, for m=1, the code effects computation of the N elements of a ZC sequence in time domain for a given $\gamma$, and for m=y' computation of the ZC sequence in frequency domain. It is noted that the modulo operations can be easily implemented using only one subtraction operation (with N) for every value of n. It is noted that the procedure of the above code may effected via software, as shown, run by a processor or similar device, in hardware as will be explained below, or any combination thereof.

Figure 3:
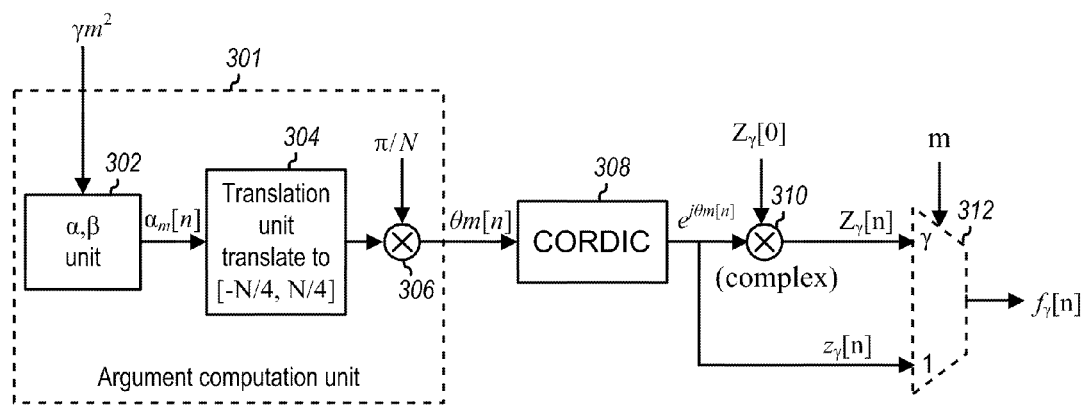
FIG. 3 illustrates an exemplary block diagram of a hardware apparatus for generating Zadoff-Chu sequences using a CORDIC generator.

FIG. 3 below shows an example of a ZC generator hardware architecture that may be used for generating the ZC sequence using the above-described methods. Of note, the architecture uses only one real multiplier and one complex multiplier (both of which perform multiplication by a constant). The architecture is fully pipelined, generating one sequence element per cycle (after an initial startup latency of around 20 cycles). The data path is parameterizeable with respect to the bit-precision needed and the desired number of CORDIC iterations to be run.

As illustrated, the hardware of FIG. 3 includes an argument computation unit 301, which contains various units for generating the argument (e.g., $\theta_m[n]$) of the cosine and sine functions computed by a CORDIC algorithm, as discussed above. Unit 301 includes an $\alpha$, $\beta$ generator 302 used to generate the $\alpha$ and $\beta$ values discussed above based on an input sequence root constant $\gamma m^2$. Generator 302 outputs the value $\alpha_m[n]$ to a translator 304, which translates $\alpha_m[n]$ to a range of $-N/4$ to $N/4$. The translated value of $\alpha_m[n]$ is input to a first multiplier 306 that multiplies the value with $\pi/N$ (i.e., equation (14) after translation to the range of $-N/4$ to $N/4$). The result of multiplier 306 is the argument value $\theta_m[n]$ (see e.g., equation (14) above) output from the argument computation unit 301.

Value $\theta_m[n]$ is input to a CORDIC calculation unit 308 for determination of $e^{j\theta_m[n]}$ in accordance with the relationships given above in equation (7). Unit 308 then outputs $e^{j\theta_m[n]}$ in time domain, which may then be multiplied by a complex multiplier unit 310 with the scaling constant $Z_\gamma[0]$ to derive the frequency domain ZC sequence $Z_\gamma[n]$ (see also equation (5) above explaining the correlation between ZC time and frequency domains). In an aspect, unit 310 may be further configured to determine the conjugate of z[n] and reordering according to the map n→γ'n(mod N), where γ'·γ=1 mod N as discussed above in connection with equation (5).

In an alternative, the ZC sequence generator of FIG. 3 may also include a multiplexer 312 or similarly functioning device configured to select a ZC sequence output $f_\gamma[n]$ between frequency domain and time domain ZC sequences. When the value of m, which is input to the selection input of mutliplexer 312, is equal to 1, the time domain sequence $z_\gamma[n]$ is output as $f_\gamma[n]$. Alternatively, when the value of m is equal to γ, the frequency domain sequence $Z_\gamma[n]$ is output as $f_\gamma[n]$.

Figure 4:
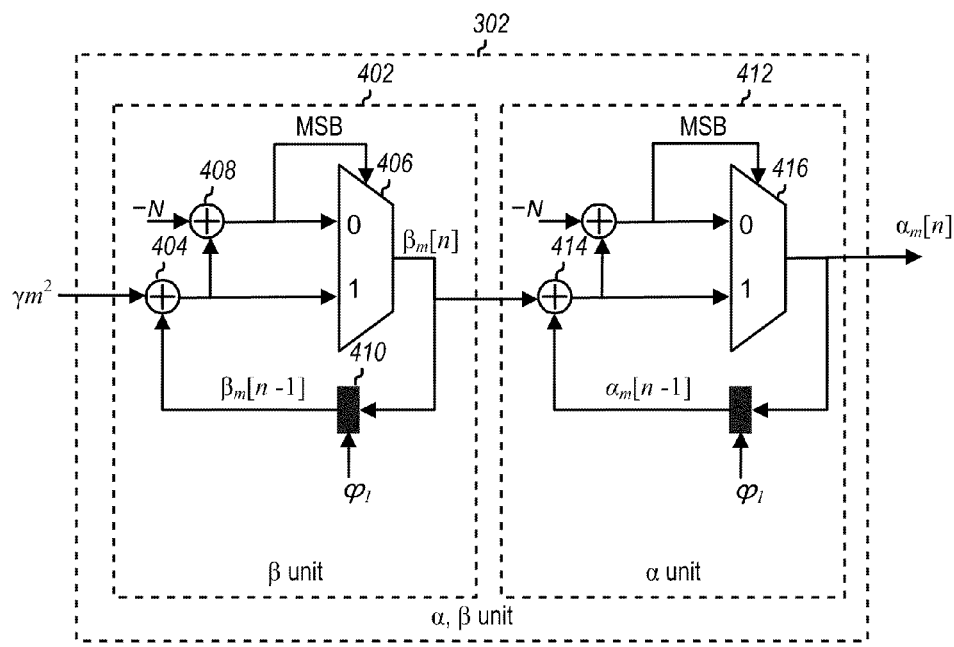
FIG. 4 illustrates an exemplary hardware implementation of α, β generator 302 that may be used in the ZC generator of FIG. 3.

FIG. 4 illustrates an exemplary hardware implementation of $\alpha$, $\beta$ generator 302 that may be used in the argument generator 301 of ZC generator 300 in FIG. 3. Constant $\gamma m^2$ is input to a β (or first recursion value) generation unit 402 (or first recursive value generation unit), and in particular to an adder 404 that recursively adds value of β for a previous n value (i.e., $\beta_m[n-1]$ as shown in equation (12) for n≥1). The result of adder 404 is input to a multiplexer 406, which selects this input to output as $\beta_m$ if a modulo operation effected by an adder 408 (acting as a subtractor as the input is −N) indicates via the most significant bit (MSB) of the result of the subtraction that n is not equal to 0. Additionally, it is noted that a flip-flop 410 or any other suitably equivalent gating device receives a clock frequency $\phi_1$ for triggering the flip-flop such that a $\beta_m$ value is generate every $1/\phi_1$ clock cycles.

FIG. 4 also illustrates an a (or second recursion value) unit 412 (or second recursive value generation unit) that receives the value $\beta_m$ from unit 402. As may be seen in FIG. 4, the unit 412 has an identical hardware structure to unit 402, and the operation is similar. An adder 414 receives the value $\beta_m$ and adds the feedback output of multiplexer 416 (i.e., $\alpha_m[n-1]$) to effect the computations discussed above in connection with equation (13). When n≥1 the multiplexer output will be selected to output this sum, otherwise zero is output when n=0.

Figure 5:
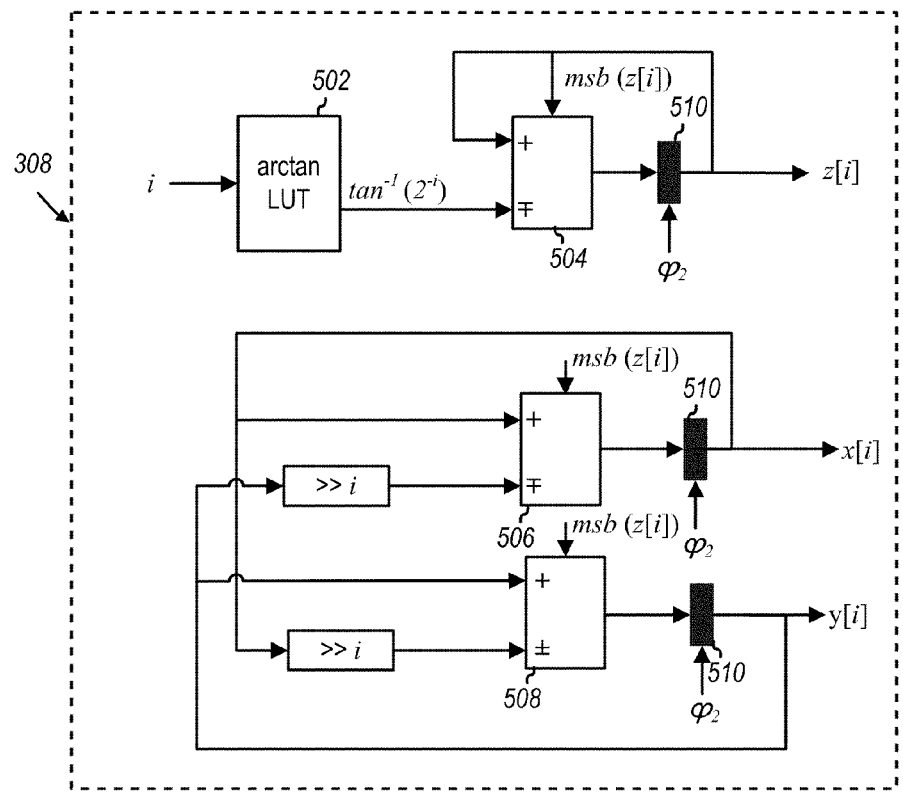
FIG. 5 is block diagram of an exemplary hardware configuration for a CORDIC generator that may be used in the ZC generator of FIG. 3.

FIG. 5 illustrates a block diagram of an exemplary hardware configuration for a CORDIC generator 308 that may be used with the ZC generator of FIG. 3. It is noted that the hardware implementation shown in FIG. 5 is based on a CORDIC computation as given in equation (7), as well as the implementation given by the code in Table 1. Additionally, it is illustrated to shown one iteration of the equations in (7), but is used B times for the desired B number of iterations (or alternatively the hardware itself could be replicated B times).

As may be seen, generator 308 includes a look-up table (LUT) of pre-calculated values for the arc tangent. The input i yields an output of the arc tangent of $2^{-i}$. Assuming that the initialization values x[1]=K; y[1]=0; and Z[1]=$\theta_m[n]$ ($\theta_m[n]$ being output from $\alpha$, $\beta$ generator 302), various arithmetic units 504, 506, and 508 are configured to perform either addition or subtraction operations of equations (7) dependent on the positive or negative sign of the decision variable $d_1$ (this is also achieved mathematically with the use of the sign function (sgn(z[i])) in the algorithm of Table 1 above) which depends on whether $z_1$ is less than 0 or not (hence the input of the most significant bit of z[i] to select the sign for the calculations). Generator 308 also includes flip flops 510 clocked with a clock having a frequency of $\phi_2$. It is noted that if the generator unit 308 is used B times, as mentioned above, the clock frequency $\phi_2$ should be set to B $\phi_1$ to allow the unit to keep up with the speed of the $\alpha$, $\beta$ generator 302.

Of further note, blocks 512 designated by ">>i," are configured to perform left-shifting of the received input bits to the right by i positions. The most-significant bit is replicated. This is mathematically equivalent to dividing the number by $2^i$ as given in equations (7) above.

Applying the ZC generator of FIGS. 3-5 to a communication system, such as LTE, it is noted that there are a set of 64 PRACH preambles available in each cell. The set of 64 preamble sequences in a cell is found by including first, in the order of increasing cyclic shift, all the available cyclic shifts of a root ZC sequence with the logical index RACH_ROOT_SEQUENCE, where RACH_ROOT_SEQUENCE is broadcasted as part of the System Information. Additional preamble sequences, in case 64 preambles cannot be generated from a single root ZC sequence, are obtained from the root sequences with the consecutive logical indexes until all the 64 sequences are found. A network configures the set of preamble sequences a UE is allowed to use, and the preamble transmitted by the UE is randomly chosen from this pool.

In an aspect, the variable Γ denotes the set of distinct ZC roots needed to generate the 64 preamble sequences, and $z_\gamma[n]$ is a root ZC sequence with index γ∈Γ and length N=839. From $z_\gamma[n]$, random access preambles $p_{\gamma,\nu}[n]$ with zero correlation zones of some length $N_{CS}-1$ are defined by cyclically shifting $z_\gamma[n]$ by v multiples of $N_{CS}$ according to the following relationship:

$$p_{\gamma,\nu}[n] = z_\gamma[(n + \nu N_{CS}) \bmod N], \gamma \in \Gamma, \nu = 0, 1, \ldots, \lfloor N/N_{CS} \rfloor - 1. \quad (15)$$

Different values of $N_{CS}$ are defined for various cell sizes and Doppler shifts. The second consecutive root is picked from the set Γ and the procedure is repeated until all 64 preambles are generated.

At the receiver side, the eNodeB is configured to compare an extracted preamble and the known pool or set of preamble sequences to determine which preamble of the set is most similar to the extracted preamble. In one aspect, a circular cross-correlation between the extracted preamble and the pool of preambles allocated to an eNodeB may be performed to determine or detect the preamble. As an example, a searcher apparatus 600 for use in an LTE eNodeB or other similar transceiver devices is illustrated in FIG. 6.

Figure 6:
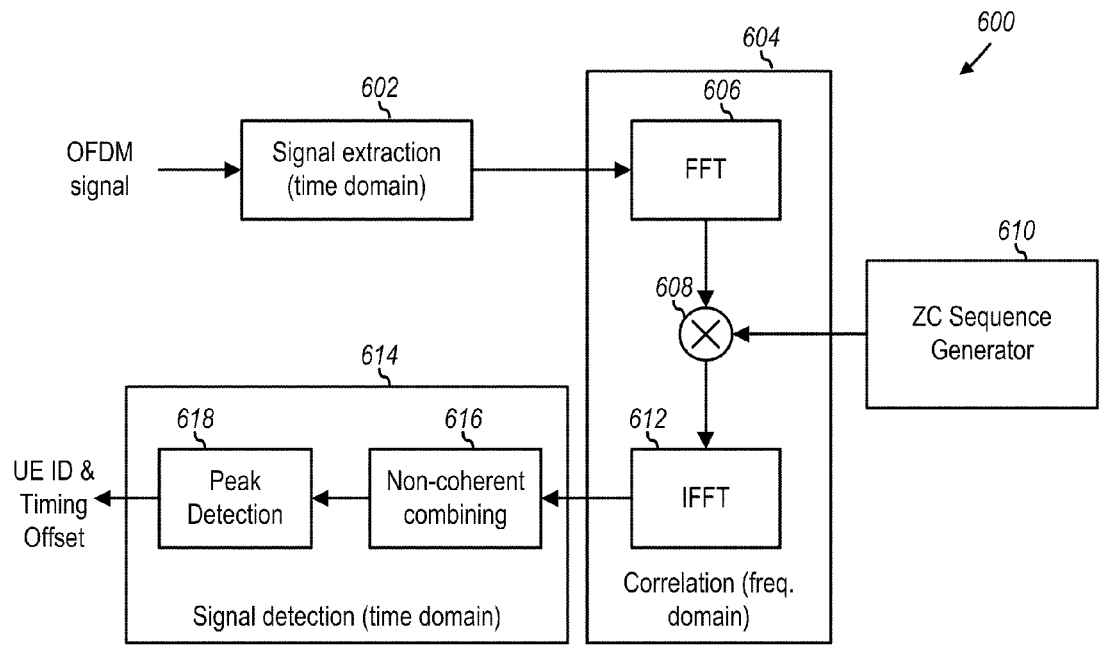
FIG. 6 is a block diagram of a searcher apparatus for use at a receiver side of a base station (e.g., an eNodeB) utilizing the ZC generator of FIG. 3.

It is noted that the apparatus 600 of FIG. 6 may be employed in a base station, such as eNodeB 100 in FIG. 1, as an example. In one example, the PRACH from a UE may be used for a connection step up through a random access process to establish uplink synchronization and obtain a unique identity. The random access procedure consists of transmission of a random access preamble by the UE, which allows the base station (e.g., eNodeB 100) to estimation the transmission timing of the UE (e.g., UE 116). The eNodeB then transmits a timing advance command to adjust the UE transmit timing based on the measurement. This mechanism, in an aspect, is handled by the physical (PHY) layer in LTE through the PRACH channel.

Turning to FIG. 6, an apparatus 600 for use at a receiver side of a base station (e.g., an eNodeB) is configured to receive an OFDM signal, such as those used in LTE for example, from a UE (e.g., UE 116) and extracts the desired signal through a signal extraction block 602. The extracted signal in one aspect is a PRACH channel for an LTE system. It is further noted that extraction may be performed in the time domain.

The extracted signal from block 602 is then input to a correlation block 604 having a Fast Fourier Transform (FFT) 606, a correlation multiplier 608 that multiplies the output of the FFT 606 with a ZC sequence from a ZC generator 610 to perform cross correlation, and an Inverse Fast Fourier Transform (IFFT) 612 to convert the product of multiplier 608 (i.e., cross correlations in frequency domain) into a vector of cross correlations in time domain. Since multiple preambles (e.g., 63 preambles) are generated from a single ZC root sequence, in an example cross-correlation is performed directly with the ZC root sequence as:

$$y_{r,\gamma}[n] = \sum_{m=0}^{N-1} x_r[m] z_\gamma^*[(n-m) \bmod N], \quad (16)$$

$$n = 0, 1, \ldots, N-1, r = 1, 2, \ldots N_r, \gamma \in \Gamma$$

where $x_r[m]$ is the received signal from the $r^{th}$ antenna (in a system with $N_r$ antennas), and $z_\gamma[m]$ is the $e\gamma^{th}$ root ZC sequence. In vector form, the cross-correlations are expressed as $\underline{y_{r,\gamma}} = [y_{r,\Gamma}[0] y_{r,\gamma}[1], \ldots, y_{r,\gamma}[N-1]]^T$ where r=1; 2; ; $N_r$. These cross-correlations can be computed efficiently in the frequency domain as $\underline{y_{r,\gamma}} = $IFFT$[X_r[l]] \cdot$flipud$(Z_\lambda^*[l]0]$, where $X_r[l]$ is the FFT of received signal $x_r[m]$ from block 602 (as generated by FFT block 606), $Z_\gamma[l]$ is the FFT of $z_\gamma[m]$ (as provided by ZC sequence generator 610), and the function flipud flips $Z^*_\gamma[l]$ to account for the circular shifting of $z_\gamma$ in equation (16) (this may be effected by either multiplier 608 or ZC generator 610). An inverse FFT is performed by block 612 on the product from multiplier 608 to provide a vector of cross correlations in time domain.

The cross-correlations from the $N_r$ antennas are then output to a signal detection unit 614. Here, the cross-correlations for the $N_r$ antennas are non-coherently combined by a non-coherent combining unit 616 to yield the following exemplary vector of correlations: $\underline{y_\gamma} = [y_\gamma[0], y_\gamma[1], \ldots, y_\gamma[N-1]]^T$, where $\gamma \in \Gamma$. Of course, if the receiver has only one antenna, combining unit 616 is not necessary since there will on be one received signal.

Combining unit 616 outputs the vector of correlations $\underline{y_\gamma}$ to a peak detection (or threshold comparison) unit 618 for determination of the identification (ID) of a UE, as well as timing offset or delay by detecting the PRACH preamble. As an example of the operation of unit 618, assume $\gamma'$ and n' respectively denote the ZC root and the sample number that yields the maximum or peak correlation is given by $y_{\gamma'}[n']$ (i.e., the sequences having the greatest similarity). Assume a variable i' is denoted as the index of $\gamma'$ in the set of ZC sequences $\Gamma$, where $0 \le i' \le |\Gamma|$. A preamble may be detected by comparing $y_{\gamma'}[n']$ with a predetermined threshold that minimizes the probability of a false alarm rate. Furthermore, the ID of the detected preamble is determined according to the relationship $I = \lfloor N/N_{CS} \rfloor \times i' + \lfloor n'/N_{CS} \rfloor$, and the delay D is determined by $D = (n' \bmod N_{CS}) \times T_s$, where $T_s$ is the sampling rate.

It is noted that ZC sequences may also applied in LTE to perform downlink symbol timing and carrier frequency synchronization. The synchronization procedure is based on reference signals constructed using ZC sequences that are broadcast by the eNodeB. A UE would perform cross-correlations against these reference signals similar to the preamble detection procedure discussed earlier in order to deduce time and frequency offsets. Since the common operation among all of these applications that use ZC sequence is cross-correlation followed by max-selection and comparison to a threshold, the accuracy depends on the bit-precision with which ZC sequence elements are represented as well as the value of the threshold used. It is also noted that in the case of preamble detection, the cross-correlation operation is quite resilient to quantization errors in representing ZC sequences.

Figure 7:
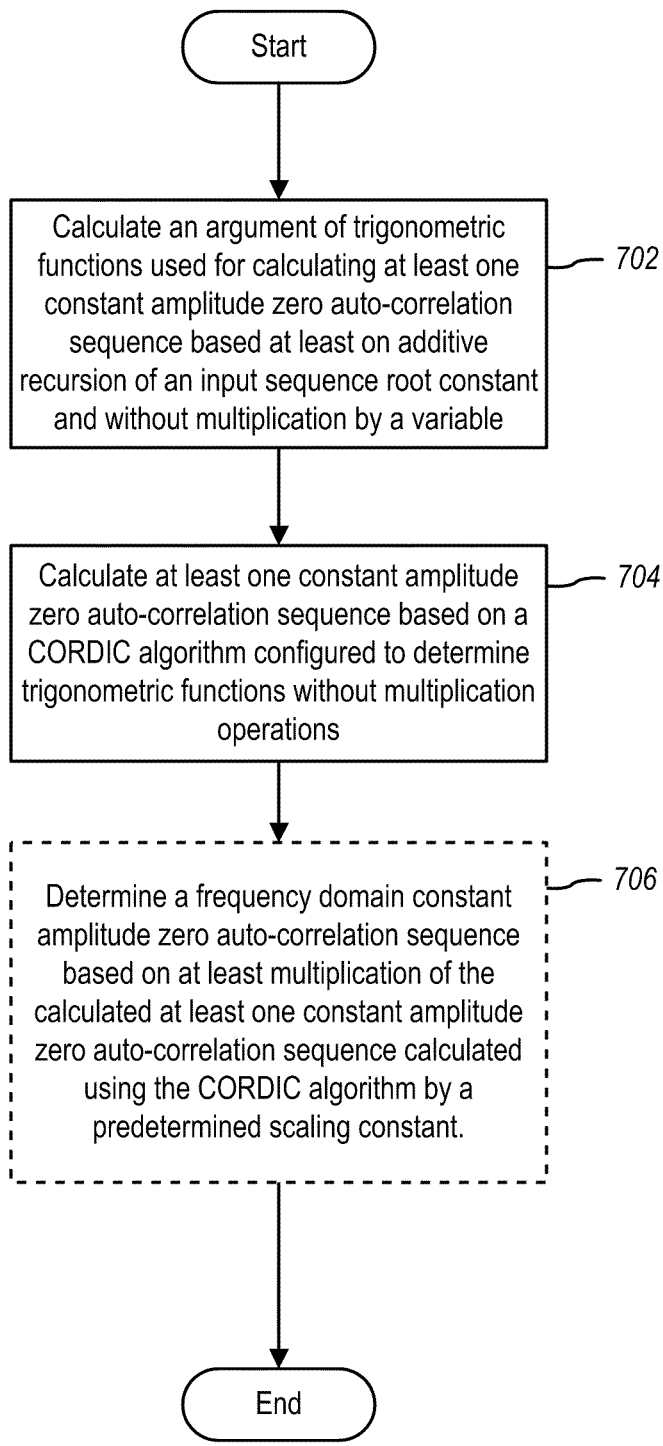
FIG. 7 illustrates a flow diagram of a method for calculating CAZAC sequences.

FIG. 7 illustrates a flow diagram of a method for calculating CAZAC sequences. As shown the method includes a block 702 including the process of calculating an argument of trigonometric functions used for calculating at least one constant amplitude zero auto-correlation sequence based at least on additive recursion of an input sequence root constant and without multiplication by a variable. The functionality of block 702 may be implemented, for example, by the argument computation unit 301 shown in FIG. 3. The functions of block 702 may be also include computation of the equations (12) and (13) as another example.

After block 702, flow proceeds to block 704 where at least one constant amplitude zero auto-correlation sequence is calculated based on a CORDIC algorithm configured to determine trigonometric functions without multiplication operations. The functionality of block 704 may be effected by the CORDIC block 308, as an example, and may include computation of equations (7) as another example.

As a further option, the method of FIG. 7 may include a block 706 wherein a frequency domain constant amplitude zero auto-correlation sequence is determined based on at least multiplication of the calculated at least one constant amplitude zero auto-correlation sequence calculated using the CORDIC algorithm by a predetermined scaling constant. The functionality of block 706 may be implemented by one or more of multiplier 310 and multiplexer 312 shown in FIG. 3, as an example. Furthermore, block 706 may include reliance upon the duality relationship embodied by equation (5) above.

Figure 8:
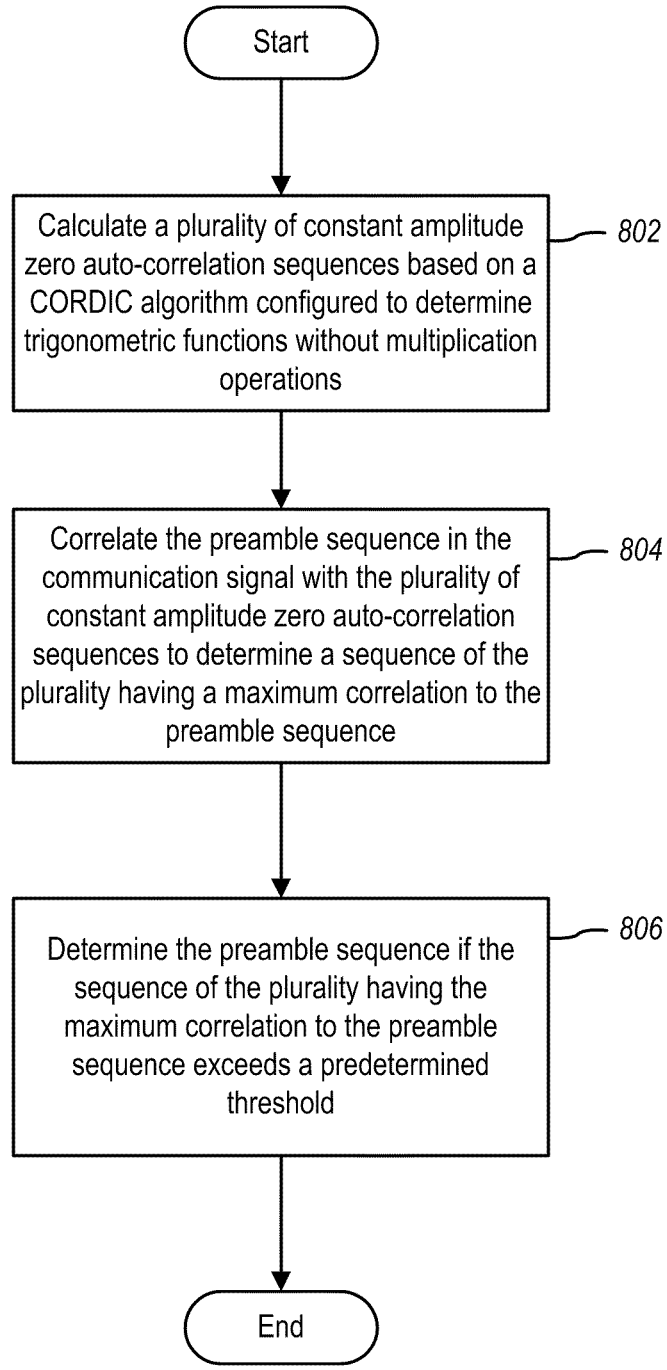
FIG. 8 illustrates a flow diagram of a method for detecting a CAZAC sequence preamble in a communication system.

FIG. 8 illustrates a flow diagram of a method for detecting a CAZAC sequence preamble in a communication system. As shown, the method includes a block 802 where a plurality of constant amplitude zero auto-correlation sequences are calculated based on a CORDIC algorithm configured to determine trigonometric functions without multiplication operations, such as in equations (7) above. This functionality may be implemented by the ZC generator of FIG. 3 or generator 610 in FIG. 6. After block 802, flow proceeds to block 804 where a preamble sequence in the communication signal is correlated with the plurality of constant amplitude zero auto-correlation sequences to determine a sequence of the plurality having a maximum correlation to the preamble sequence. This function may be effected by correlation unit 604, as an example.

After block 804, flow proceeds to block 806 determining the preamble sequence if the sequence of the plurality having the maximum correlation to the preamble sequence exceeds a predetermined threshold. This functionality may implementable by signal detection block 614, as an example.

Figure 9:
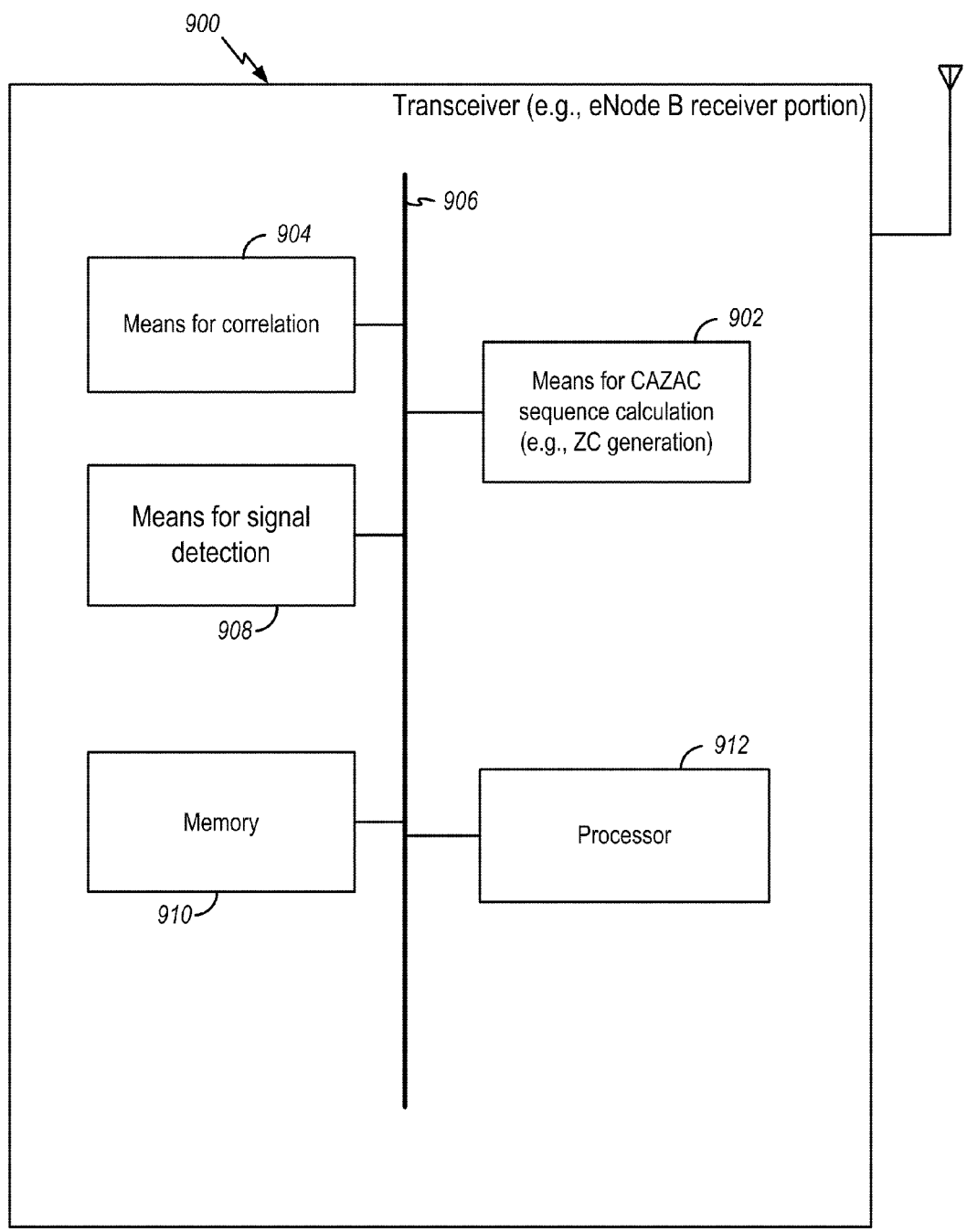
FIG. 9 illustrates an apparatus for detecting a CAZAC sequence preamble in a communication system.

FIG. 9 illustrates an apparatus 900 for detecting a CAZAC sequence preamble in a communication system. Apparatus 900 may be a transceiver for use in communication system, such as an LTE system, for example. In one aspect, apparatus 900 may be part of receiver portion of an eNodeB. According to another aspect, the CAZAC sequence preamble is a ZC sequence preamble in a PRACH of an LTE system.

As illustrated, apparatus 900 includes means 902 for calculating a plurality of constant amplitude zero auto-correlation sequences. Means 902 includes calculations based on a CORDIC algorithm configured to determine trigonometric functions without multiplication operations. Means 902 may be implemented by generator 601 in FIG. 6 or the generator of FIG. 3, as two examples, or any other suitable equivalent.

Apparatus 900 also includes a bus 904, or some other equivalent means for communicating data or information between the various means of apparatus 900. Connected to bus 904 is a means 906 for correlating the preamble sequence in the communication signal with the plurality of constant amplitude zero auto-correlation sequences to determine a sequence of the plurality having a maximum correlation to the preamble sequence. Means 906 may be implemented by correlation unit 604, as an example, or any other suitable equivalent device. The communication signal may be received via a means for signal extrication (not shown in FIG. 9, but see unit 602 in FIG. 6 as one example) or equivalent device.

Further, apparatus 900 includes means 908 for signal detection. Means 908, in particular, is configured to determine or detect the preamble sequence if the sequence of the plurality having the maximum correlation to the preamble sequence exceeds a predetermined threshold. Means 908 may be implemented by signal detection unit 614, as one example, or any other suitable equivalent.

Apparatus 900 may also include a memory 910 for storing computer readable instructions and an accompanying processor 912 capable of executing such instructions in order to carry out any, some, or all of the functions performed by the means of apparatus 900.

In light of the above examples, methods and apparatus have been disclosed computes the elements of the CAZAC (e.g., ZC) sequence efficiently based on the CORDIC algorithm and with high-accuracy in real-time, eliminating the need for storing a large number of long complex-element ZC sequence elements. Moreover, the presently disclosed examples eliminate the need of non-constant multipliers, and efficiently implement the modulo-a-prime operation, thus eliminating the need for even further memory. The disclosed architecture is fully pipelined, and programmable in terms of bit-precision and desired accuracy of CORDIC iterations. Furthermore, it is noted that the disclosed methods and apparatus for computing ZC sequences may be valuable in other applications that use ZC sequences such as channel estimation and frequency/time tracking.

One skilled the art will appreciate that the disclosed configuration and equations provided herein are merely one exemplary manner of performing CORDIC and argument calculations, and that other ways of implementing these calculations without multiplication by variables and exploiting the duality between time and frequency domain ZC sequences are contemplated. For example, translation need not be applied to the value $\alpha$ or a different translation than that disclosed could be applied. Accordingly, the scaling constant $Z_y[0]$ would be configured differently from what has been disclosed, while still affording conversion from time domain to frequency domain through the simple multiplication by a constant rather than a variable.

It is understood that the specific order or hierarchy of steps in the processes disclosed is merely an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The word "exemplary" is used herein to mean "serving as an example, instance, or illustration." Any example described herein as "exemplary" is not necessarily to be construed as preferred or advantageous over other examples.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for calculating constant amplitude zero auto-correlation sequences, the method comprising:
    calculating an argument of trigonometric functions used for calculating at least one constant amplitude zero auto-correlation sequence based at least on additive recursion of an input sequence root constant and without multiplication by a variable; and
    calculating, using a processor, the at least one constant amplitude zero auto-correlation sequence using a Coordinate Rotation Digital Computer (CORDIC) algorithm configured to calculate trigonometric functions used in determining the sequence without performing multiplication operations and based on the calculated argument.

2. The method as defined in claim 1, wherein the at least one constant amplitude zero auto-correlation sequence is a Zadoff-Chu (ZC) sequence.

3. The method as defined in claim 1, further comprising:
    determining a frequency domain constant amplitude zero auto-correlation sequence based on at least multiplication of the calculated at least one constant amplitude zero auto-correlation sequence calculated using the CORDIC algorithm by a predetermined scaling constant.

4. The method as defined in claim 3, wherein determining the frequency domain sequence further comprises:
    multiplying a conjugate of the calculated at least one constant amplitude zero auto-correlation sequence by the predetermined scaling constant; and
    reordering the sequence according to a predetermined relationship.

5. The method as defined in claim 4, wherein the predetermined relationship is mapping of a variable n to a multiple of a sequence root according to the relationship $n \mapsto \gamma'n(\bmod N)$, where $\gamma' \cdot \gamma = 1 \bmod N$, where $n=0, 1, 2, \ldots, N-1$, N is the period of the sequence, and $\gamma$ is the sequence root.

6. The method as defined in claim 1, wherein calculating the argument of the trigonometric function includes:
    performing a first additive recursion with the input sequence root constant to compute a first recursion value;
    performing a second additive recursion using the first recursion value to compute a second recursion value; and
    multiplying the second recursion value by a predetermined constant to determine the argument.

7. The method as defined in claim 6, further comprising: translating the second additive recursion to a predetermined range of the sequence.

8. An apparatus for calculating constant amplitude zero auto-correlation sequences, the apparatus comprising:
    an argument computation unit configured to calculate an argument of trigonometric functions used for calculating at least one constant amplitude zero auto-correlation sequence based at least on additive recursion of an input sequence root constant and without multiplication by a variable; and
    a Coordinate Rotation Digital Computer (CORDIC) calculation unit configured to calculate the at least one constant amplitude zero auto-correlation sequence using a CORDIC algorithm configured to calculate trigonometric functions used in determining the sequence without performing multiplication operations and based on the calculated argument, wherein the Coordinate Rotation Digital Computer (CORDIC) calculation unit is implemented in hardware or by a processor.

9. The apparatus as defined in claim 8, wherein the at least one constant amplitude zero auto-correlation sequence is a Zadoff-Chu (ZC) sequence.

10. The apparatus as defined in claim 8, further comprising:
    a complex multiplier unit configured to determine a frequency domain constant amplitude zero auto-correlation sequence based on at least multiplication of the calculated at least one constant amplitude zero auto-correlation sequence calculated using the CORDIC algorithm by a predetermined scaling constant.

11. The apparatus as defined in claim 10, wherein the complex multiplier unit is further configured to multiply a conjugate of the calculated at least one constant amplitude zero auto-correlation sequence by the predetermined scaling constant, and reorder the sequence according to a predetermined relationship.

12. The apparatus as defined in claim 11, wherein the predetermined relationship is mapping of a variable n to a multiple of a sequence root according to the relationship $n \mapsto \gamma'n(\bmod N)$, where $\gamma' \cdot \gamma = 1 \bmod N$, where $n=0, 1, 2, \ldots, N-1$, N is the period of the sequence, and $\gamma$ is the sequence root.

13. The apparatus as defined in claim 8, wherein the argument computation unit further comprises:
    a first additive recursion unit configured to perform a first additive recursion with the input sequence root constant to compute a first recursion value;
    a first additive recursion unit configured to receive the first recursion value and perform a second additive recursion using the first recursion value to compute a second recursion value; and
    a multiplier configured to multiply the second recursion value by a predetermined constant to determine the argument.

14. The apparatus as defined in claim 13, wherein the argument computation unit further comprises:
    a translation unit configured to translate the second additive recursion to a predetermined range of the sequence.

15. A method for detecting a preamble sequence based on a constant amplitude zero auto-correlation sequence in a communication signal, the method comprising:
    calculating, using a processor, a plurality of constant amplitude zero auto-correlation sequences based on a Coordinate Rotation Digital Computer (CORDIC) algorithm configured to determine trigonometric functions without multiplication operations;
    correlating the preamble sequence in the communication signal with the plurality of constant amplitude zero auto-correlation sequences to determine a sequence of the plurality having a maximum correlation to the preamble sequence; and
    determining the preamble sequence if the sequence of the plurality having the maximum correlation to the preamble sequence exceeds a predetermined threshold.

16. The method as defined in claim 15, wherein each of the plurality of constant amplitude zero auto-correlation sequences is a Zadoff-Chu (ZC) sequence.

17. The method as defined in claim 15, wherein calculating the plurality of constant amplitude zero auto-correlation sequences based on a CORDIC algorithm further comprises:
calculating an argument of trigonometric functions used for calculating the plurality of constant amplitude zero auto-correlation sequences based at least on additive recursion of an input sequence root constant and without multiplication by a variable.

18. The method as defined in claim 15, wherein correlating the preamble sequence further comprises:
fast Fourier transforming the preamble sequence to frequency domain;
determining a plurality of frequency domain constant amplitude zero auto-correlation sequences based on at least multiplication of the calculated plurality of constant amplitude zero auto-correlation sequence calculated using the CORDIC algorithm by a predetermined scaling constant; and
cross-correlating the plurality of frequency domain preamble sequences with the frequency domain preamble sequence.

19. The method as defined in claim 18, wherein determining the frequency domain sequences further comprises:
multiplying conjugates of each of the calculated plurality of constant amplitude zero auto-correlation sequences by the predetermined scaling constant; and
reordering the plurality of constant amplitude zero auto-correlation sequences according to a predetermined relationship.

20. The method as defined in claim 19, wherein the predetermined relationship is mapping of a variable n to a multiple of a sequence root according to the relationship n↦γ'n(mod N), where γ'·γ=1 mod N, where n=0, 1, 2, . . . , N-1, N is the period of the sequence, and γ is the sequence root.

21. The method as defined in claim 17, wherein calculating the argument of the trigonometric function includes:
performing a first additive recursion with the input sequence root constant to compute a first recursion value;
performing a second additive recursion using the first recursion value to compute a second recursion value; and
multiplying the second recursion value by a predetermined constant to determine the argument.

22. The method as defined in claim 15, wherein the preamble is a PRACH preamble configured for use in an LTE communication system.

23. An apparatus for detecting a preamble sequence based on a constant amplitude zero auto-correlation sequence in a communication signal received by an antenna, the apparatus comprising:
a sequence generator configured to calculate a plurality of constant amplitude zero auto-correlation sequences based on a Coordinate Rotation Digital Computer (CORDIC) algorithm configured to determine trigonometric functions without multiplication operations;
a correlation unit configured to correlate the preamble sequence in the communication signal with the plurality of constant amplitude zero auto-correlation sequences to determine a sequence of the plurality having a maximum correlation to the preamble sequence; and
a signal detection unit configured to determine the preamble sequence if the sequence of the plurality having the maximum correlation to the preamble sequence exceeds a predetermined threshold.

24. The apparatus as defined in claim 23, wherein each of the plurality of constant amplitude zero auto-correlation sequences is a Zadoff-Chu (ZC) sequence.

25. The apparatus as defined in claim 23, wherein the sequence generator further comprises:
an argument computation unit configured to calculate an argument of trigonometric functions used for calculating the plurality of constant amplitude zero auto-correlation sequences based at least on additive recursion of an input sequence root constant and without multiplication by a variable.

26. The apparatus as defined in claim 23, further comprising:
the sequence generator further comprising a multiplier unit configured to determine a plurality of frequency domain constant amplitude zero auto-correlation sequences based on at least multiplication of the calculated plurality of constant amplitude zero auto-correlation sequence calculated using the CORDIC algorithm by a predetermined scaling constant; and
the correlation unit further comprising a fast Fourier transform configured to transform the preamble sequence to frequency domain, and a correlation multiplier configured to cross-correlating the plurality of frequency domain preamble sequences from the sequence generator with the frequency domain preamble sequence through multiplication operation.

27. The apparatus as defined in claim 26, wherein the multiplier unit of the sequence generator is further configured to multiply conjugates of each of the calculated plurality of constant amplitude zero auto-correlation sequences by the predetermined scaling constant; and reorder the plurality of constant amplitude zero auto-correlation sequences according to a predetermined relationship.

28. The apparatus as defined in claim 27, wherein the predetermined relationship is mapping of a variable n to a multiple of a sequence root according to the relationship n↦γ'n(mod N), where γ'·γ=1 mod N, where n=0, 1, 2, . . . , N-1, N is the period of the sequence, and γ is the sequence root.

29. The apparatus as defined in claim 25, wherein the argument computation unit is further configured to:
perform a first additive recursion with the input sequence root constant to compute a first recursion value;
perform a second additive recursion using the first recursion value to compute a second recursion value; and
multiply the second recursion value by a predetermined constant to determine the argument.

30. The apparatus as defined in claim 23, wherein the preamble is a PRACH preamble configured for use in an LTE communication system.

31. The apparatus as defined in claim 23, wherein the apparatus is configured for use in a receiver portion of an eNodeB in an LTE communication system.

32. An apparatus for detecting a preamble sequence based on a constant amplitude zero auto-correlation sequence in a communication signal received by an antenna, the apparatus comprising:
means for calculating a plurality of constant amplitude zero auto-correlation sequences based on a Coordinate Rotation Digital Computer (CORDIC) algorithm configured to determine trigonometric functions without multiplication operations;
means for correlating the preamble sequence in the communication signal with the plurality of constant amplitude zero auto-correlation sequences to determine a sequence of the plurality having a maximum correlation to the preamble sequence; and means for determining the preamble sequence if the sequence of the plurality having the maximum correlation to the preamble sequence exceeds a predetermined threshold.

33. The apparatus as defined in claim 32, wherein each of the plurality of constant amplitude zero auto-correlation sequences is a Zadoff-Chu (ZC) sequence.

34. The apparatus as defined in claim 32, wherein the means for calculating the plurality of constant amplitude zero auto-correlation sequences based on a CORDIC algorithm further comprises:

means for calculating an argument of trigonometric functions used for calculating the plurality of constant amplitude zero auto-correlation sequences based at least on additive recursion of an input sequence root constant and without multiplication by a variable.

35. The apparatus as defined in claim 32, wherein the means for correlating the preamble sequence further comprises:

means for fast Fourier transforming the preamble sequence to frequency domain;

means for determining a plurality of frequency domain constant amplitude zero auto-correlation sequences based on at least multiplication of the calculated plurality of constant amplitude zero auto-correlation sequence calculated using the CORDIC algorithm by a predetermined scaling constant; and means for cross-correlating the plurality of frequency domain preamble sequences with the frequency domain preamble sequence.

36. The apparatus as defined in claim 35, wherein the means for determining the frequency domain sequences further comprises:

means for multiplying conjugates of each of the calculated plurality of constant amplitude zero auto-correlation sequences by the predetermined scaling constant; and means for reordering the plurality of constant amplitude zero auto-correlation sequences according to a predetermined relationship.

37. The apparatus as defined in claim 36, wherein the predetermined relationship is mapping of a variable n to a multiple of a sequence root according to the relationship n ↦ γ'n(mod N), where γ'·γ=1 mod N, where n=0, 1, 2, ..., N-1, N is the period of the sequence, and γ is the sequence root.

38. The apparatus as defined in claim 34, wherein the means for calculating the argument of the trigonometric function includes:

means for performing a first additive recursion with the input sequence root constant to compute a first recursion value;

means for performing a second additive recursion using the first recursion value to compute a second recursion value; and means for multiplying the second recursion value by a predetermined constant to determine the argument.

39. The apparatus as defined in claim 32, wherein the preamble is a PRACH preamble configured for use in an LTE communication system.

40. The apparatus as defined in claim 32, wherein the apparatus is configured for use in a receiver portion of an eNodeB in an LTE communication system.

41. A computer program product, comprising:
a non-transitory computer-readable medium comprising:
code for causing a computer to calculate a plurality of constant amplitude zero auto-correlation sequences based on a Coordinate Rotation Digital Computer (CORDIC) algorithm configured to determine trigonometric functions without multiplication operations;
code for causing a computer to correlate a preamble sequence in a communication signal with the plurality of constant amplitude zero auto-correlation sequences to determine a sequence of the plurality having a maximum correlation to the preamble sequence; and
code for causing a computer to determine the preamble sequence if the sequence of the plurality having the maximum correlation to the preamble sequence exceeds a predetermined threshold.

42. The computer program product as defined in claim 41, wherein each of the plurality of constant amplitude zero auto-correlation sequences is a Zadoff-Chu (ZC) sequence.

43. The computer program product as defined in claim 41, wherein the code for causing a computer to calculate the plurality of constant amplitude zero auto-correlation sequences based on a CORDIC algorithm further comprises:

code for causing a computer to calculate an argument of trigonometric functions used for calculating the plurality of constant amplitude zero auto-correlation sequences based at least on additive recursion of an input sequence root constant and without multiplication by a variable.

44. The computer program product as defined in claim 41, wherein code for causing a computer to correlate the preamble sequence further comprises:

code for causing a computer to fast Fourier transform the preamble sequence to frequency domain;

code for causing a computer to determine a plurality of frequency domain constant amplitude zero auto-correlation sequences based on at least multiplication of the calculated plurality of constant amplitude zero auto-correlation sequence calculated using the CORDIC algorithm by a predetermined scaling constant; and code for causing a computer to cross-correlate the plurality of frequency domain preamble sequences with the frequency domain preamble sequence.

45. The computer program product as defined in claim 44, wherein code for causing a computer to determine the frequency domain sequences further comprises:

code for causing a computer to multiply conjugates of each of the calculated plurality of constant amplitude zero auto-correlation sequences by the predetermined scaling constant; and code for causing a computer to reorder the plurality of constant amplitude zero auto-correlation sequences according to a predetermined relationship.

46. The computer program product as defined in claim 45, wherein the predetermined relationship is mapping of a variable n to a multiple of a sequence root according to the relationship n ↦ γ'n(mod N), where γ'·γ=1 mod N, where n=0, 1, 2, ..., N-1, N is the period of the sequence, and γ is the sequence root.

47. The computer program product as defined in claim 43, wherein code for causing a computer to calculate the argument of the trigonometric function includes:

code for causing a computer to perform a first additive recursion with the input sequence root constant to compute a first recursion value;

code for causing a computer to perform a second additive recursion using the first recursion value to compute a second recursion value; and code for causing a computer to multiply the second recursion value by a predetermined constant to determine the argument.

48. The computer program product as defined in claim 41, wherein the preamble is a PRACH preamble configured for use in an LTE communication system.

* * * * *